United States Patent [19]
Jacquet et al.

[11] Patent Number: 5,638,449
[45] Date of Patent: Jun. 10, 1997

[54] DATA TRANSMISSION INSTALLATION OF THE RADIO NETWORK TYPE, AND CORRESPONDING PROCESS

[75] Inventors: Philippe Jacquet, Buc; Paul Muhlethaler, Maisons Laffite, both of France

[73] Assignee: INRIA Institut National de Recherche en Informatique et en Automatique, Le Chesnay Cedex, France

[21] Appl. No.: 307,578

[22] PCT Filed: Jan. 26, 1994

[86] PCT No.: PCT/FR94/00097
§ 371 Date: Sep. 26, 1994
§ 102(e) Date: Sep. 26, 1994

[87] PCT Pub. No.: WO94/17616
PCT Pub. Date: Aug. 4, 1994

[30] Foreign Application Priority Data

Jan. 26, 1993 [FR] France .................... 93 00750

[51] Int. Cl.⁶ .................. H04L 9/00; H04L 12/413
[52] U.S. Cl. .................. 380/49; 380/2; 375/200; 370/447
[58] Field of Search .................. 380/2, 49, 3, 4, 380/23, 25, 59; 375/200, 201, 202, 203, 205; 370/85.2, 85.3; 340/825.31, 825.34

[56] References Cited

U.S. PATENT DOCUMENTS

| | | | |
|---|---|---|---|
| 4,641,375 | 2/1987 | Dean | 370/74 X |
| 4,665,519 | 5/1987 | Kirchner et al. | 370/94 |
| 5,040,175 | 8/1991 | Tuch et al. | 370/85.2 |

FOREIGN PATENT DOCUMENTS

| | | | |
|---|---|---|---|
| 0222308 | 5/1987 | European Pat. Off. | H04Q 7/02 |
| 0263421 | 4/1988 | European Pat. Off. | H04L 4/16 |
| 86/04755 | 8/1986 | WIPO | H04L 11/16 |
| 89./11126 | 11/1989 | WIPO | G06F 7/04 |
| 91/05416 | 4/1991 | WIPO | H04B 17/00 |
| 91105571 | 4/1991 | WIPO | G01B 9/02 |
| 93/20636 | 10/1993 | WIPO | H04L 12/56 |
| 93/20638 | 10/1993 | WIPO | H04L 29/02 |

OTHER PUBLICATIONS

Yamauchi, "Reliable Multicast Over The Mobile Packet Radio Channel", *IEEE Vehicular Technology Conference*, pp. 366–371, (1990).

*Primary Examiner*—Bernarr E. Gregory
*Attorney, Agent, or Firm*—Foley & Lardner

[57] ABSTRACT

A method of data transmission for a data transmission system which includes at least two data processing stations, each of the data processing stations being equipped with a network interface configured to communicate by radio over a data channel, to emit messages on request, to collect messages received, and to establish confirmative emission or reception orders, includes a first step of receiving an order confirming emission of a message in one of the data processing stations. In the next step, the station responds to the order by carrying out, over the data channel, a rapidly alternating emission/reception according to a chosen pattern peculiar to this station. The station recognizes a collision if a signal of superior strength to a first threshold strength is received during a substantial part of at least one silence of the rapidly alternating emission/reception, thus demonstrating the concomitant emission of another station. The collision is processed if so recognized.

20 Claims, 7 Drawing Sheets

DATA TRANSMISSION INSTALLATION OF THE RADIO NETWORK TYPE, AND CORRESPONDING PROCESS

BACKGROUND OF THE INVENTION

The invention relates to information networks operating by radio, that is to say having the airways as communication medium, in particular those which function in batch mode.

SUMMARY OF THE INVENTION

The applicant made initial general proposals in his French patent application no. 92 04 032 (FR-A-2 689 658; WO-93/20636). He proposed certain improvements in a subsequent French patent application no. 93 00 750, which, in accordance with a new provision of the French law, enabled the second application (93 00 750) to benefit from the filing date of the first one (92 04 032), for the joint parties. The present application concerns the new elements in application no. 93 00 750, presented in summary form.

The proposed data transmission installation is of the type comprising at least two data processing stations [postes de traitement de données] (the word "traitement" being understood in its most elementary sense). Each station is equipped with a network interface capable of transmitting messages on request, and of collecting messages received. This comprises an emission-reception management device. Also provided are a test means for recognizing a collision condition ("collision detector") together with a collision resolving means, following upon a recognized collision condition.

One of the main functions of this management device is to give confirmative emission and reception orders to the network interface.

According to the previous application FR 92 04 032, each of the stations comprises a pluridirectional radio emission-reception device (involving several directions, but not necessarily omnidirectional). In its modes of execution described in detail, it is provided in particular that this radio emission-reception device operates on a central channel, as well as on one or more lateral channels.

It was found that these first proposals could present disadvantages, particularly because of congestion of the airways.

The aim of the present application is to provide a solution to this problem.

The invention is based on a network where at least two data processing stations are provided, each equipped with a network interface. These stations are capable of cooperating by radio in a chosen frequency band, or data channel, to emit messages on request and to collect messages received. The stations to this end establish confirmative emission or reception orders.

According to a characteristic of the invention, in response to an order confirming emission of a message in a station, there is carried out in said frequency band (used for the data) rapidly alternating emission/reception, according to a chosen pattern peculiar to this station. A collision is recognized if a signal higher in strength than an initial threshold strength is received for a substantial part of at least one silence of this rapid alternating emission/reception, thus demonstrating the concomitant emission of another station.

In equipment terms, each of the stations comprises a radio emission-reception device operating in a chosen frequency band, where it is capable of rapid emission-reception switching. In response to an order confirming emission of a message or a batch, said device operates in rapidly alternating emission-reception mode, according to a pattern chosen to be peculiar to this emission/reception device. A collision is recognised by a collision detecting means if a signal higher in strength than an initial threshold strength is received during a substantial part of at least one silence of this rapid alternating emission/reception, thus demonstrating the concomitant emission of another station.

In the presence of a recognized collision, if data of the message have already been transmitted, their transmission can be invalidated; it is decided, if necessary, not to transmit the remainder of the message or batch; and a collision processing procedure is undertaken in certain cases, particular if collision resolution is necessary.

In the absence of recognized collision, the emission of a part at least of any remainder of the message (or of the batch) can be carried out in the chosen frequency band.

Other characteristics and advantages of the invention will appear from an examination of the following detailed description and of the attached drawings, where FIG. 1 is a highly simplified diagram of a conventional information network where the transmission medium is wire;

FIG. 6 is a more detailed functional diagram of a part of FIG. 5, while

Figure 5:
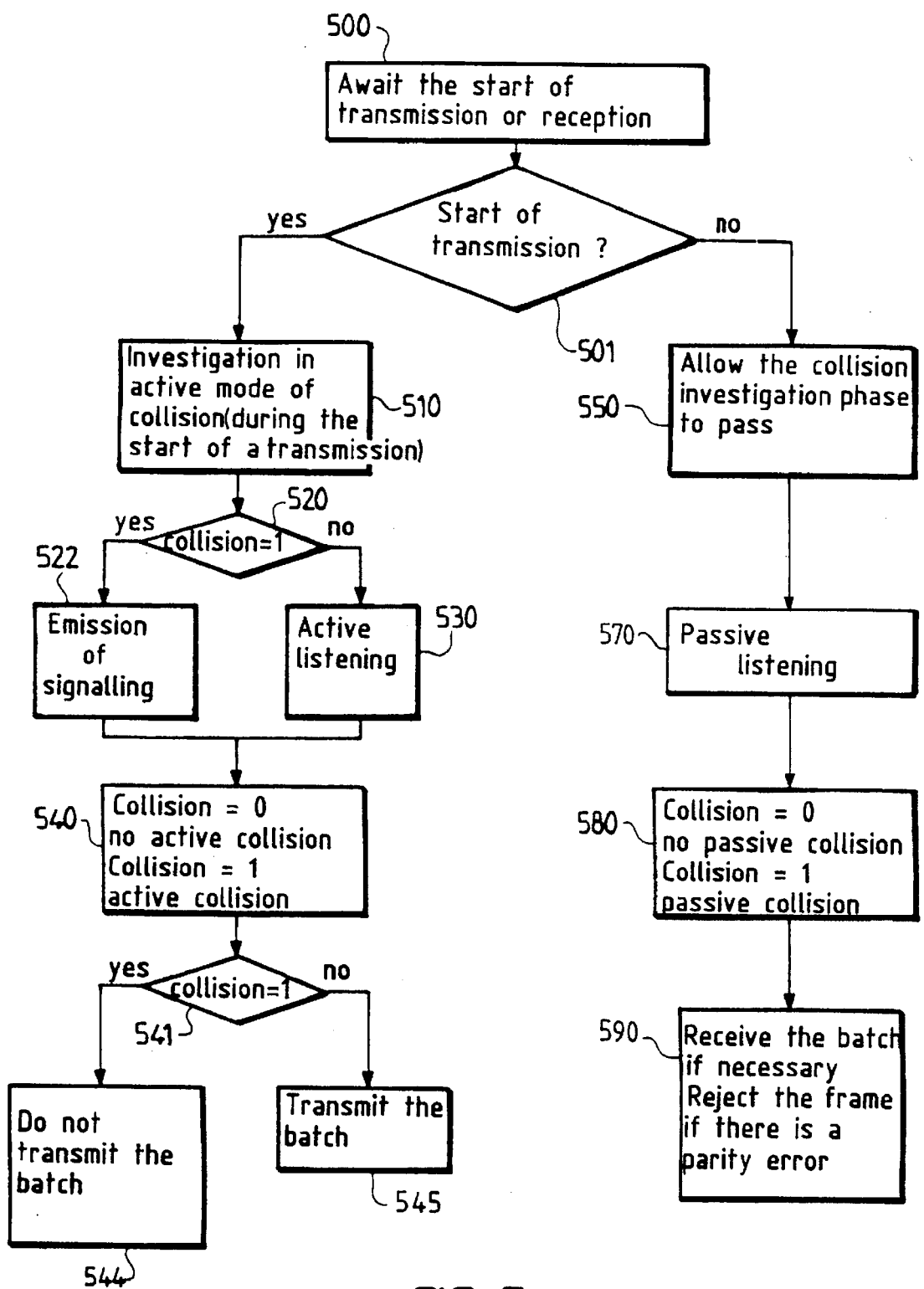
FIG. 5 is a functional diagram of the mechanism applicable to the detection of collisions.
Figure 7:
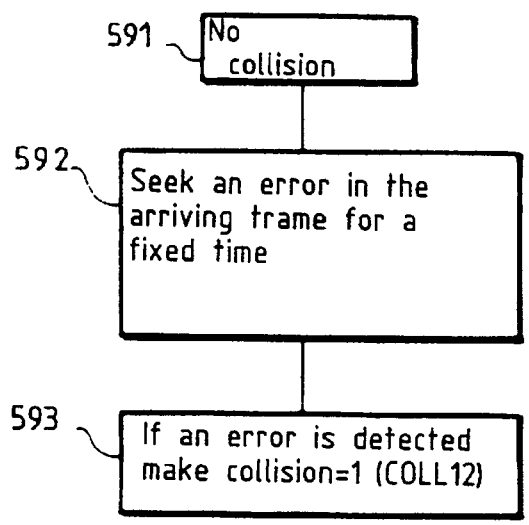
Figure 8:
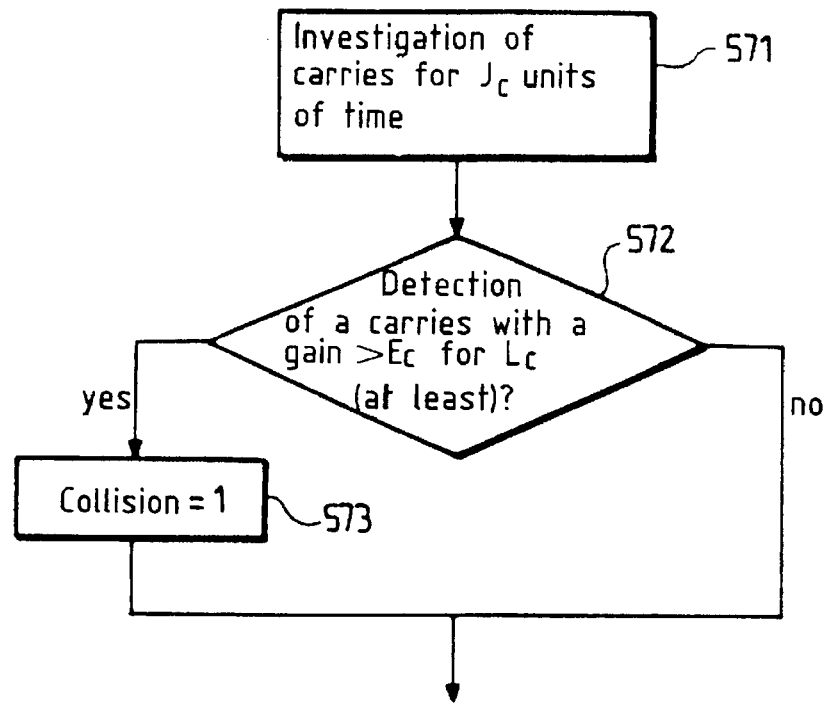
Figure 9:
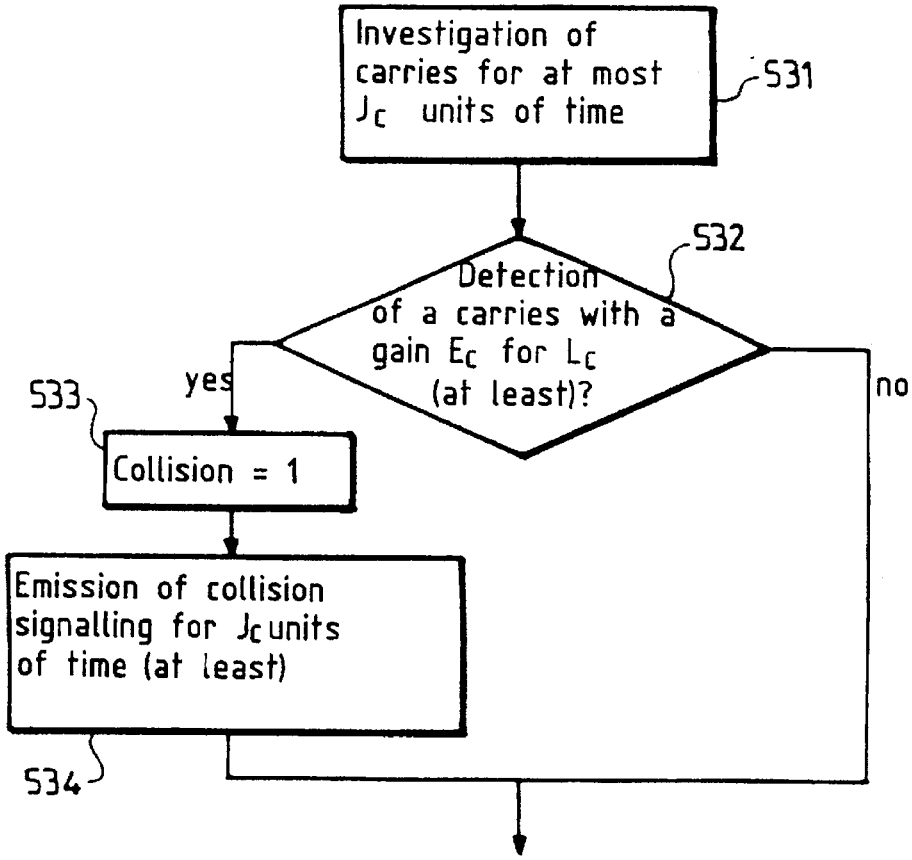
Figure 10:
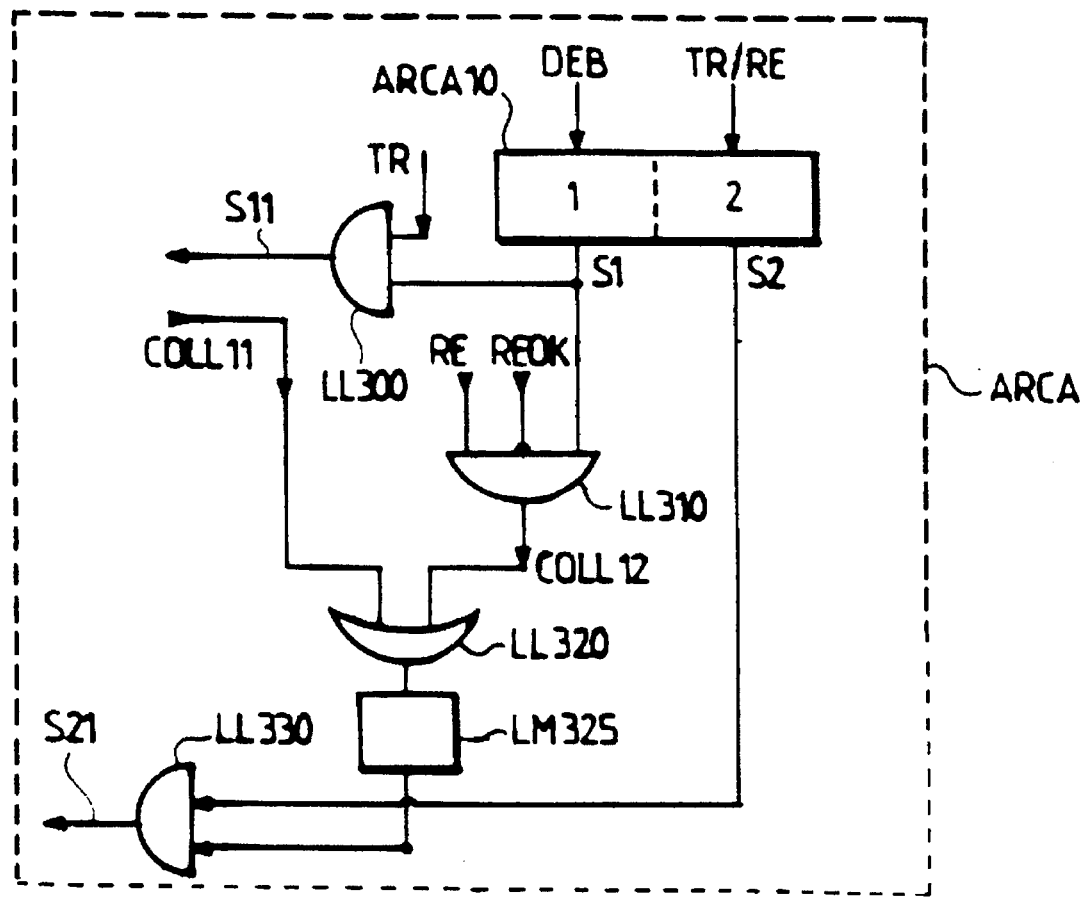

FIGS. 7, 8, and 9 are other more detailed functional diagram relating to parts of the mechanism of FIG. 5; and FIG. 10 is an equivalent electrical diagram of the operations of an automatic collision detector unit.

DETAILED DESCRIPTION

The attached drawings are, for the most part, definite in character. They consequently form an integral part of the description and can not only serve to complement the latter, but also contribute to the definition of the invention where necessary.

Figure 1:
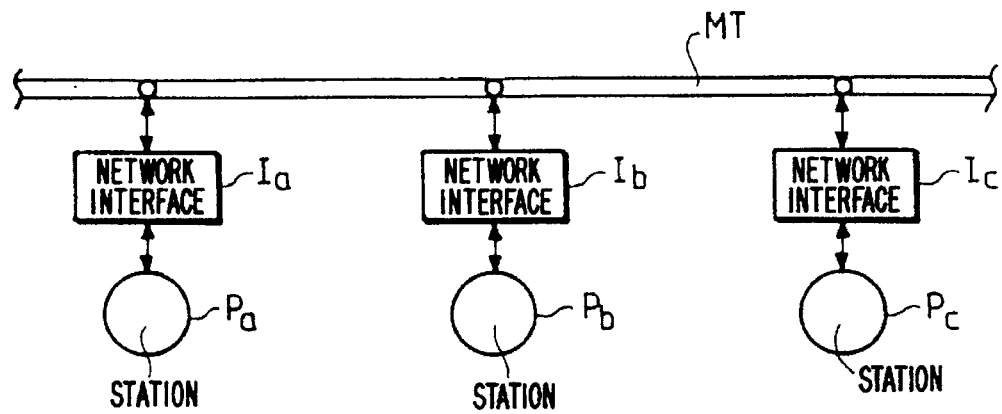

In FIG. 1, a transmission medium MT is linked to network interfaces Ia to Ic, connected respectively to stations Pa to Pc. The conventional structure of a data transmission information network is involved here, to which a CSMA/CD protocol (of which standard IEEE 802.3 gives an example for cable) can apply.

The stations such as Pa are data processing stations [postes de traitement de donnes](the word "traitement" is used here in its most elementary sense, since this processing can be very simple). All the processings carried out in the station are external to the transmission of data properly so called. But there can exist in the station specific operations which allow specifically for its nature and for certain conditions applying to the transmission of data ("higher layers" of the transmission protocol).

Figure 2:
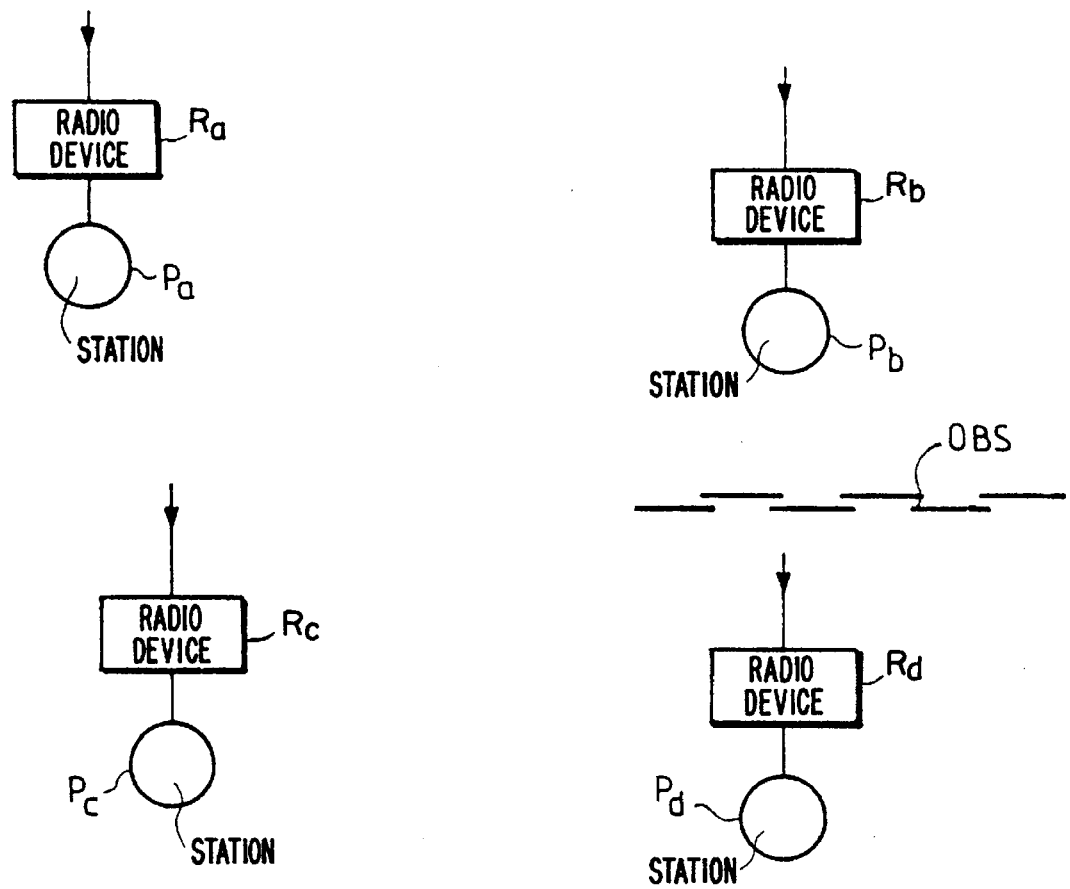
FIG. 2 is a highly simplified diagram illustrating four stations interconnected by a radio transmission.

In FIG. 2, the stations Pa to Pd are now linked to radio devices Ra to Rd fitted with antennas. In the simplified example shown, all the stations can exchange data directly, except for the stations Rb and Rd, between which an obstacle OBS exists.

The term network interface used here has a broader connotation than for cable information networks and includes everything which is located between the station properly so called and the antenna or antennas which the latter comprises.

Although the invention can serve for the transmission of "messages" (a unit of data to be transmitted, of any size), its application is preferably based on "frames" or "batches". These words refer to the elementary data transmission unit, that is to say the block of data which can be transmitted together.

One of the special features of the present invention is to ensure that when a station wishes to emit a frame, this station is the only one to do so in its radio contact range.

Figure 3:
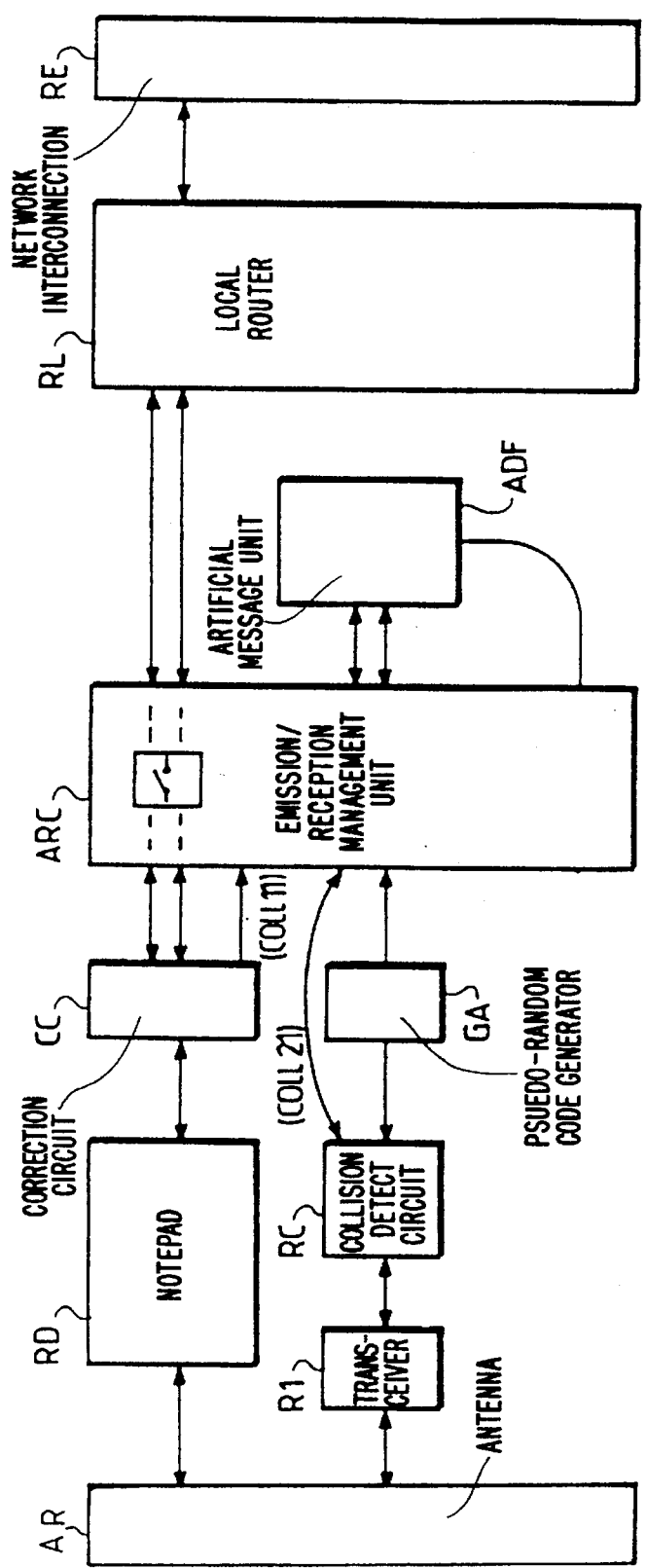
FIG. 3 is the flow sheet of the whole of the network interface, for a station according to the invention.

Reference is now made to FIG. 3, which shows the general structure of an interface network for a station. The previous application FR-A-2 689 658 distinguished between a central channel and one or more lateral channels. Here, a single channel is used (which is shown by a single antenna AR in FIG. 3).

From right to left:

- a block RE designates the interconnection standardized to standard IEEE 802, which permits connection to a network output of a computer. This interconnection is for example carried out with the integrated circuit i82586 sold by INTEL Corporation;
- a block RL is a "local router" whose role is defined in application FR-A-2 689 658. Its general function is to establish batches to be transmitted, with transmission requests, and also to collect the batches correctly received and in certain cases redirect them;
- a block ARC is the emission/reception management unit, which it does as a function of collisions. There can be added to it a block ADF capable of causing batches forming artificial messages to be emitted, if this is necessary for example to correct frequency errors or to exchange topological data required for the routing;
- a radio emission/reception antenna AR is linked to a radio emission/reception unit.

This unit comprises:

- a block GA which operates as a pseudo-random code generator. Such codes are used for various purposes here (not only for emission/reception);
- a circuit or block RC, cooperating with a transceiver stage for rapid switching R1, with a view to detecting emission collisions;
- a notepad RD, for the emission/reception of data (frame or batch). It is linked to a circuit CC which has the task during emission of approving the batch of corrective codes, and during reception of verifying the correction of these codes in order to detect any errors inside a batch (received normally otherwise).

Figure 4:
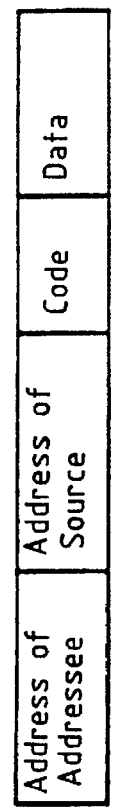
FIG. 4 shows the format of the frames.

The format of the batches can be the conventional ETH-ERNET format complying with standard IEEE 802.3 (FIG. 4), complemented in some cases as described in application FR-A-2 689 658. The methods of coding for emission/reception and for error detection can be those described in FR-A-2 689 658.

FIG. 5 illustrates a method of data transmission according to the invention.

In FIG. 5, the stage 500 marks the waiting for the start of transmission (emission) or reception.

On such a start, the stage 501 tests whether emission or reception is involved.

The case of a station at the start of emission will be considered first of all.

Figure 6:
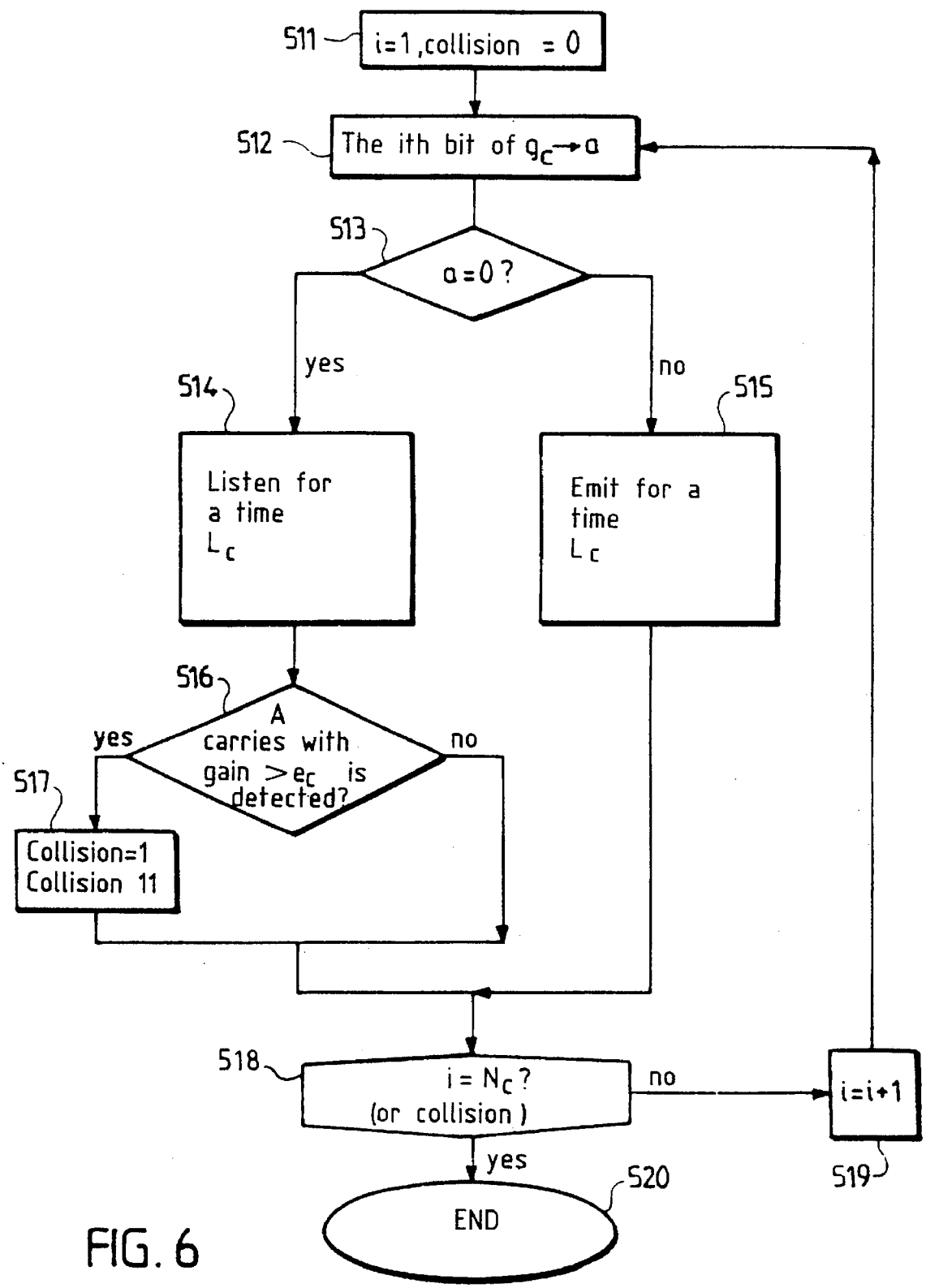

Prior to each batch transmission, as soon as the data channel is recognized as free (500), this station which wishes to emit (501, YES) inserts directly onto the channel the collision detection stage 510 shown in FIG. 5, and set out in detail in FIG. 6.

The pseudo-random generator GA (FIG. 3) has supplied a pseudo-random word $g_c$ possessing $N_c$ bits.

At the stage 511 (FIG. 6), a processing index i is initialized to 1, while the variable COLL11 is set to the value a 0, representing "false" collision.

The stage 512 consists in sampling in the word $g_c$ its ith bit, which will be referred to as a.

The stage 513 tests whether the bit a signifies 0 or 1. If it signifies 1, the stage 515 consists in emitting on the first lateral channel for a time $L_c$. If it signifies 0, one will instead listen at the stage 514 on the first lateral channel for the time $L_c$.

At the stage 516, it is tested whether a carrier with a gain higher than a threshold value $e_c$ has been detected ("third-party emission"). If so, this means that another station has emitted at the same time (on the basis of a different pseudo-random word). In this case, the stage 517 consists in raising the variable COLL11 to 1. With advantage, the carrier detection of the stage 516 is not carried out immediately on the start of the interval of waiting time defined at the stage 514. It is preferable to wait for a time $1_c$ so that the collision detector cannot be deceived by the echo of its own emissions. Moreover, it is ensured that the emission of the stage 515 appears continuously when two consecutive bits of the pseudo-random word $g_c$ are on one.

Then (test 518), if the last bit of the pseudo-random word $g_c$ has been reached, (or else if a third-party emission has been noted), the final output consists in returning to the stage 520 of the FIG. 5. Otherwise, the stage 519 increments the working index i, and one returns to 512.

In practice, the block GA is not necessarily a pseudo-random generator. The binary word $g_c$ can in fact remain the same for a fairly long period. Moreover, it is not necessarily completely random. It can be composed for example of a chosen prefix followed by a random part. The prefix can be managed independently, in particular by the higher level functions of the network, for example in order to define priorities. If absolutely necessary, the purely random character can be cancelled, provided the prefix is selected so that the various emitters can be distinguished.

Figure 6A:
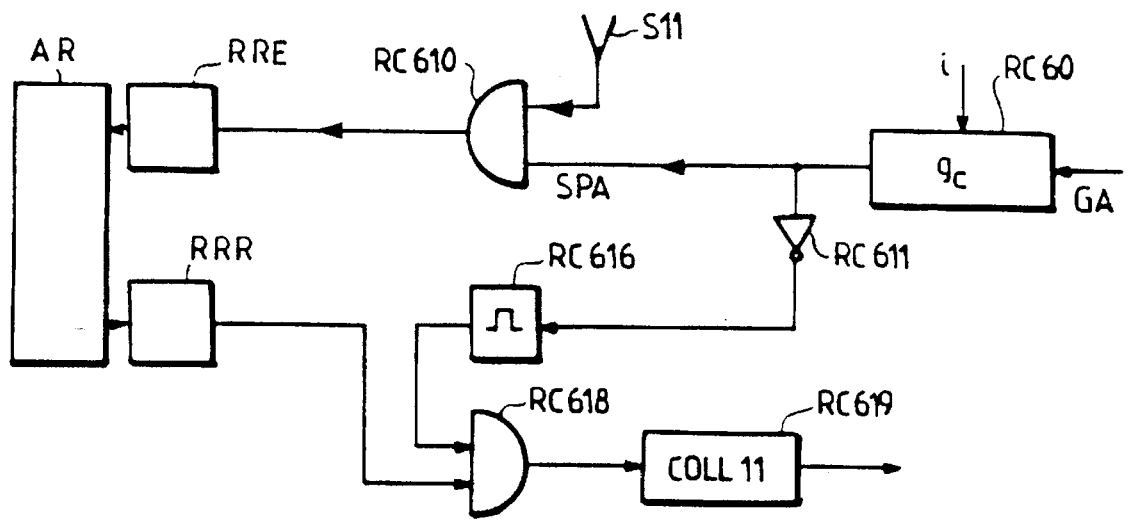
FIG. 6A is an equivalent electrical diagram corresponding to FIG. 6.

In equipment terms (FIG. 6A), the transceivers RD and R1 of FIG. 3 are grouped together here, and broken down into an emission part RRE and a reception part RRR. The block GA has constructed a pseudo-random word gc This word can be stored in a register RC60 receiving clock pulses which define the processing index i.

At the start of an emission, the signal S11 is true. The AND gate RC610 is therefore validated. It moreover receives the current bit as output from the register RC60. If the bit signifies 1, the emitter RRE is excited. If the bit signifies 0, its complement established by the inverter RC611 excites a delay defined by a stage RC616, after which an AND gate RC618 is validated in order to monitor the output of the receiver RRR. If an emission is obtained while the current bit of the word $g_c$ is on 0, and after the delay $l_c$ already mentioned, the output COLL11 of the gate RC618 passes to true, and COLL11=1 is stored in memory RC619.

In 520 (FIG. 5), a possible collision state is noted, from the logic signal COLL11 (values: 0=false; 1=true).

Each station therefore as it were defines an (irregular) emission/reception comb which is peculiar to it. $L_c$ is the clock used to define this comb. $L_c$ must be chosen higher than the time during which echoes are received after emission (multiple data paths and/or fading). $J_c$ is a time (in principle predetermined) chosen sufficiently long so that, in the presence of a collision, all the stations concerned can have knowledge of it.

Although they take place on the same channel, it must be clear that the rapid emission/reception phase (the "comb") and the data emission phase are entirely distinct: the comb does not form part of the data emitted.

Other stages 522 to 540 can then be provided in order to complement the noting of a collision state and/or signal this collision state to the other stations, as described previously.

To the extent that each station interrupts its emission/reception comb as soon as it has itself recognized the existence of a collision, the anticipated end of the comb (or the passing to permanent emission, with alternating emission/reception) can be regarded by all the stations as representing a collision state.

In every case, for a station which is currently in emission mode, the final decision is:

if a collision is detected (or signalled), this station refrains from transmitting its batch (544) or any remainder of the latter; the emission is interrupted, in certain cases after insertion of a sequence provided with a parity error, on special command addressed to the block CC, as shown in the stage 542; the station can switch to reception mode;

in the opposite case, where no collision has been signalled, the station transmits (545) its batch or the remainder of the latter just after the end of the stage described previously, through the stage RRE.

It will be noticed that this process constitutes an avoidance of collision (when the comb is emitted as a batch heading), since it allows a "winner" in each collision, namely the one which comes to have the greater word $g_c$ (in binary numerical notation with the highest weights on the left).

The stations which are in reception mode have first of all waited (stage 550), in order to allow the collision investigation phase conducted by the emitter or emitters of the moment to commence.

These stations currently in reception mode then proceed to a passive detection or listening 570, set out in detail in FIG. 8; the sub-stage 571 consists in listening for Jc units of time; the sub-stage 572 seeks a pure carrier possessing a gain of more than $E_c$, for a substantial period of time, at least equal to $L_c$ (or another signal of determined particular characteristics, at the frequency and time levels); if such a carrier is detected during the time thus defined, the sub-stage 573 validates a collision variable COLL22 to 1.

They can thus detect (580) if an error representative of a collision has occurred in reception mode (optionally signal it). Even if the reception is apparently good, the batch received is subjected to a check (590), in particular of parity.

An example of the check 590 will now be described with reference to FIG. 7. First of all, the sub-stage 591 establishes a false collision condition (COLL12=0). At the sub-stage 592, the block CC investigates a possible parity (or other) error in the arriving frame, for a fixed period of time. At the sub-stage 593, the signal COLL12 is raised to 1 if such an error is detected.

At the level of the emitters of the moment, several variants can be considered.

The simplest is that they pass to the stages 544 and 545 as soon as any collision is detected.

They can also proceed to a passive listening according to the stage 570 (FIG. 8), like the stations which are in reception mode. Active listening (530; FIG. 9) may be preferred, which adds to the passive listening a "collision signalling" when a collision is recognized (in particular during listening). The stages 531 to 533 of FIG. 9 are identical to the stages 571 to 573 of FIG. 8. However, if a collision (COLLll=1) has been recognized in a station which is in emission mode at the time, it is still possible to pass through the stage 522, in order to signal this collision to the other stations. This "collision signalling" can be effected by any means, including cases where an emission would be modified into its carrier or any modulation of the latter, and even cases where the emission is stopped. It should be noted that numerous inversions of this kind can be considered.

The collision does not always take place at the start of a batch. An error can in fact be found during a batch ("belated collision"). In this case, predefined criteria determine whether a collision is signalled or not: to simplify matters, it can be decided beforehand to always signal a belated collision, or on the contrary never to signal it. The signalling can be done in various ways, and its duration can vary. Moreover, if the batch is decomposable into several distinct segments of parity bits, it may be declared partially good (partially well transmitted).

What has been described with reference to FIG. 6 concerns the fist operating stage of the automatic collision detection unit, which stage may be carried out either in an active state or in a passive state, according to the result of the test 501 of FIG. 5.

Reference is now made to FIG. 10, which shows in detail a part (ARCA) of the block ARC of FIG. 3.

A sequencer ARCA10 defines some stages 1 and 2 as a function for example of an initial logic signal DEB and a logic signal TR/RE indicating whether emission or reception is involved.

This results in logic signals S1 and S2 representative respectively of the first and second stages of the automatic collision detector unit. If one is in emission mode (TR), a logic gate LL300 sets to true a signal S11 (first stage, active state). This signal S11 activates the circuits of FIG. 6A already described. The latter can supply in return a collision signal COLL11 concerning a collision detected on a local emission.

If one is in reception mode, an AND gate LL310 is involved. The latter possesses an input receiving the signal RE representative of reception, an input receiving the signal S1 and a third input receiving, complemented, the signal REOK. The reception of an incorrect frame will establish a detected collision logic signal COLL12 representative of a collision in reception mode which is ascribable to other stations.

An AND gate LL320 combines the signals COLL11 and COLL12 into a signal COLL1 memorized in a memory LM325 (local collision detector).

If no collision is memorized in COLL1, a gate LL30 combines the signals COLL1 and S2 in order to allow, in the second stage, the data emission/reception state, through the logic signal S21.

Various modifications can be made to the diagram of FIG. 5.

In reception mode, after the phase 590, and if an error has been detected in reception mode, this error (potentially a collision) can be signalled and, reciprocally, such a signalling coming from a third party detected (which applies also to the emitters).

In the aforegoing, it has been assumed that the comb is emitted before the batch.

As a variant, or in addition, the emission of a batch of data can be divided into two periods (or more), and the rapid emission/reception of the comb be placed between these two fractions of emissions of the batch (or even at the end of the batch). In this case, the emission of the comb continues in principle up to its end: the stage 518 of FIG. 6 is restricted to the test that i=$N_c$, without taking account of a possible collision detected. However, after detection of a collision, the comb may change into a permanent emission, instead of pursuing the alternating emission/reception.

A collision investigation is involved here. If a collision is detected, and if the data of the batch have already been transmitted, their transmission can be invalidated. It is desirable that the collision is signalled at the end of the comb, so that the stations in collision can refrain from emitting the remainder of their batch.

In the presence of a recognized collision, if data of the message have already been transmitted, their transmission can be invalidated. It can be decided, if necessary, not to transmit the remainder of the batch. A collision processing procedure is carried out optionally, particularly if a collision resolution is necessary.

In the absence of recognized collision, the emission of a part at least of any remainder of the batch can be carried out in said chosen frequency band.

The collision resolution can be effected in various ways, taking account in particular of the manner in which the collision was detected.

In the case of emission of the comb "before the batch", it may suffice to allow the winner to emit, while the others await the end of this emission, after which they will attempt a new emission.

In the case of emission of the comb during the batch" or "at the end of the batch", the collision resolution can be effected as described in French patent application FR 92 94 032. The same applies to the emission of batches forming artificial messages.

The collisions detected during reception of the batch can be resolved by any appropriate means, such as those currently known (including FR-A-2 689 713).

The invention can be modified in various ways.

The invention does not exclude multiplexing "in frequency", and/or in time, including in the body of a batch of data (which necessitates interruption of the transmission of the batch of data in progress), and its possible resumption after insertion of data "multiplexed in time". Any distinct emission can be used.

For example, it can be assumed that the data channel is already multiplexed in frequencies, and that the emission of each batch occupies a part or the whole of the sub-channels. The following installation can then be envisaged. Prior to each batch transmission, a heading is placed on one or more sub-channels, which requests them to each act in a manner specified in advance. Each of these sub-channels is used for a short period of time to transmit a particular emission/ reception pattern, as provided above. When a collision is detected by the detection of a signal during a listening phase on at least one of the sub-channels used, the collision is signalled on one or more sub-channels of the data channel, or in another manner.

We claim:

1. A method of data transmission for a data transmission system including at least two data processing stations, each of said data processing stations being equipped with a network interface for communicating by radio in one of a chosen frequency band and a data channel, for emitting messages on request, for collecting messages received, and for establishing confirmative emission or reception orders, said method comprising the steps of:

receiving an order confirming emission of a message in one of said data processing stations;

responding to said order confirming emission of said message in said one of said data processing stations by carrying out in said one of said frequency band and said data channel a rapidly alternating emission/reception according to a chosen pattern peculiar to said one of said data processing stations;

recognizing a collision if a signal of superior strength to a first threshold strength is received during a substantial part of at least one silence of the rapidly alternating emission/reception, thus demonstrating a concomitant emission by another data processing station; and processing said collision if said collision is recognized.

2. The method according to claim 1, wherein the collision is signalled by a change in the rapidly alternating emission/ reception.

3. The method according to claim 1, wherein the rapidly alternating emission/reception is interrupted as soon as a collision is recognized.

4. The method according to claim 1, further comprising the step of recognizing a collision in a reception mode by violation of a predefined criterion.

5. The method according to claim 1, wherein the one of said frequency band and said data channel is multiplexed in frequency.

6. The method according to claim 1, wherein the one of said frequency band and said data channel is multiplexed in time.

7. A data processing station comprising:

a network interface for transmitting messages on request and collecting received messages, said network interface including a collision detecting means and an emission/reception management device for giving confirmative emission/reception orders; and a radio emission/reception device for operating in a chosen frequency band and for rapid emission/ reception switching, wherein in response to an order confirming a message, said device operates in rapidly alternating emission/reception mode according to a pattern chosen to be peculiar to said radio emission/ reception device, and wherein the collision detecting means recognizes a collision if a signal of superior strength to a first threshold strength is received during a substantial part of at least one silence of said rapidly alternating emission/reception mode, thus demonstrating a concomitant emission by another data processing station, and, in the absence of said collision, the emission of at least a part of the message is carried out in said chosen frequency band.

8. The data processing station according to claim 7, wherein the pattern chosen includes a random portion.

9. The data processing station according to claim 7, wherein in response to a recognized collision, the rapidly alternating emission/reception mode is modified in a predetermined manner.

10. The data processing station according to claim 7, wherein the radio emission/reception device interrupts the rapidly alternating emission/reception mode as soon as a collision is recognized.

11. The data processing station according to claim 7, wherein the network interface recognizes a collision in a reception mode by violation of a predetermined criterion.

12. The data processing station according to claim 7, wherein the emission/reception management device comprises an automatic unit forming a collision detecting means, said automatic unit possessing a first stage where said automatic unit is placed in the active state on a confirmative emission order, in order to control the transceiver in rapidly alternating emission/reception mode according to said chosen pattern, and a second stage where, in the absence of collision, said automatic unit controls the transceiver for the emission of data.

13. The data processing station according to claim 7, wherein the radio emission/reception device operates on an emission/reception channel multiplexed in frequency.

14. The data processing station according to claim 7, wherein the radio emission/reception device operates on an emission/reception channel multiplexed in time.

15. A data transmission system comprising:
a first data processing station; and
a second data processing station in communication with said first data processing station, wherein each of said first and said second data processing station includes:
  a network interface for transmitting messages on request and collecting received messages, said network interface including a collision detecting unit and an emission/reception management device for giving confirmative emission/reception orders, and
  a radio emission/reception device for operating in a chosen frequency band and for rapid emission/reception switching, wherein in response to an order confirming a message, said device operates in rapidly alternating emission/reception mode according to a pattern chosen to be peculiar to said radio emission/reception device, and wherein
the collision detecting unit recognizes a collision if a signal of superior strength to a first threshold strength is received during a substantial part of at least one silence of said rapidly alternating emission/reception mode, thus demonstrating a concomitant emission by another data processing station, and, in the absence of said collision, the emission of at least a part of the message is carried out in said chosen frequency band.

16. The data transmission system according to claim 15, wherein the pattern chosen includes a random portion.

17. The data transmission system according to claim 15, wherein in response to a recognized collision, the rapidly alternating emission/reception mode is modified in a predetermined manner.

18. The data transmission system according to claim 15, wherein the radio emission/reception device interrupts the rapidly alternating emission/reception mode as soon as a collision is recognized.

19. The data transmission system according to claim 15, wherein the network interface recognizes a collision in a reception mode by violation of a predetermined criterion.

20. The data transmission system according to claim 15, wherein the emission/reception management device comprises an automatic unit forming a collision detecting unit, said automatic unit possessing a first stage where said automatic unit is placed in the active state on a confirmative emission order, in order to control the transceiver in rapidly alternating emission/reception mode according to said chosen pattern, and a second stage where, in the absence of a collision, said automatic unit controls the transceiver for the emission of data.

* * * * *